US012570369B1

(12) United States Patent
Andrew

(10) Patent No.: US 12,570,369 B1
(45) Date of Patent: Mar. 10, 2026

(54) FIBER CORE GRIP

(71) Applicant: Fox Factory, Inc., Duluth, GA (US)

(72) Inventor: Fraser Andrew, North Vancouver (CA)

(73) Assignee: FOX FACTORY, INC., Duluth, GA (US)

( * ) Notice: Subject to any disclaimer, the term of this patent is extended or adjusted under 35 U.S.C. 154(b) by 0 days.

(21) Appl. No.: 18/925,180

(22) Filed: Oct. 24, 2024

(51) Int. Cl.
 *B62K 21/26* (2006.01)
 *B32B 5/02* (2006.01)
 *B32B 5/26* (2006.01)

(52) U.S. Cl.
 CPC .............. *B62K 21/26* (2013.01); *B32B 5/022* (2013.01); *B32B 5/024* (2013.01); *B32B 5/263* (2021.05); *B32B 5/266* (2021.05)

(58) Field of Classification Search
 CPC ......... B62K 21/26; B32B 5/266; B32B 5/263; B32B 5/022; B32B 5/024
 See application file for complete search history.

(56) References Cited

U.S. PATENT DOCUMENTS

| | | | | |
|---|---|---|---|---|
| 2,523,637 A | * | 9/1950 | Stanfield | A63B 60/14 |
| | | | | 473/301 |
| 4,044,625 A | * | 8/1977 | D'Haem | G05G 1/06 |
| | | | | 16/431 |
| 6,455,449 B1 | * | 9/2002 | Veiga | B60R 21/235 |
| | | | | 442/220 |
| 7,942,077 B2 | * | 5/2011 | Lai | B62K 21/26 |
| | | | | 74/551.8 |
| 2008/0276751 A1 | * | 11/2008 | Lai | B62K 21/26 |
| | | | | 74/551.9 |
| 2009/0045541 A1 | * | 2/2009 | Lazano | B29C 45/372 |
| | | | | 74/552 |
| 2009/0158884 A1 | * | 6/2009 | Kuo | B62K 21/26 |
| | | | | 74/551.9 |

* cited by examiner

*Primary Examiner* — Thomas C Diaz
(74) *Attorney, Agent, or Firm* — Schmeiser, Olsen & Watts LLP

(57) ABSTRACT

A fiber core grip with a flexible core is provided. The fiber core grip includes a grip member formed of an elastomeric material and a flexible core, such as a flexible woven core. The flexible woven core includes a first end cap having an aperture extending therethrough and a second end cap. The flexible woven core also includes a plurality of fibers woven together in a helix shape to create spaces between the plurality of fibers and provide the flexible woven core with a fill capacity of less than about 100%. The grip member may be coupled to the flexible woven core, and the grip member penetrates through the spaces between the plurality of fibers and contacts a handlebar when the fiber core grip is coupled to the handlebar.

24 Claims, 11 Drawing Sheets

100

110
Providing a grip member comprising an elastomeric material

120
Providing a flexible core having a first end cap having an aperture extending therethrough, a second end cap, and a plurality of fibers 130
Coupling the grip member to the flexible core

FIBER CORE GRIP

BACKGROUND OF THE INVENTION

Technical Field

This invention relates generally to a grip and more particularly to a grip having a fiber core.

State of the Art

Generally, grips for vehicles with handlebars, such as bicycles and motorcycles and the like, typically come in two types, slide-on grips and lock-on grips. Slide-on grips are formed of a single material, such as thermoplastic rubber (TPR). Slide-on grips provide performance to the grips in terms of comfort and ride feel. However, the slide-on grips require special care to be fitted to a handlebar to prevent slipping during use, such as by the use of glue and/or wire ties. Slide-on grips also have problems with rotation if torqued hard enough or if water or oil etc. gets between the grip and the handlebar.

Lock-on grips are formed with a rigid tube, comprising a thermoplastic core, such as polypropylene, that is molded first and followed by an over mold of TPR to provide texture and comfort. However, the thin over mold of TPR of the lock-on grip creates a hard feeling grip.

Accordingly, there is a need for an improved grip that provides comfort and is convenient to install.

SUMMARY OF THE INVENTION

An embodiment includes a fiber core grip comprising: a grip member; a first end cap having an aperture extending therethrough; a second end cap; and a flexible core comprising a plurality of fibers extending between the first end cap and the second end cap, wherein the grip member is coupled to the flexible core, and wherein the fiber core grip is configured to couple to a handle.

The grip member may comprise an elastomeric material. The flexible core may be a flexible woven core. The plurality of fibers may be woven and/or braided together in a helix shape to provide spaces between the plurality of fibers. In one embodiment, the spaces between the plurality of fibers may have a fill capacity of less than about 100%. In one embodiment, the spaces between the plurality of fibers may have a fill capacity of about 100%. The grip member may penetrate through the spaces between the plurality of fibers. The handle may be a handlebar. The second end cap may be provided with a closed end. In embodiments, the flexible woven core may further comprise a plurality of flexible fiber layers.

The flexible core may be a flexible non-woven core. The flexible non-woven core may comprise a plurality of flexible layers, wherein the plurality of flexible layers may comprise at least one first flexible fiber layer and at least one second flexible fiber layer. The plurality of fibers may comprise a first plurality of fibers, and wherein the first plurality of fibers is arranged to form the at least one first flexible fiber layer by securing the first plurality of fibers contiguously together in a parallel relationship and extending at a first angle with respect to a longitudinal axis of the fiber core grip. The second plurality of fibers may be arranged to form the at least one second flexible fiber layer by securing the second plurality of fibers contiguously together in a parallel relationship and extending at a second angle in an opposite direction to the first angle with respect to the longitudinal axis of the fiber core grip. The first plurality of fibers of the at least one first flexible fiber layer may be arranged to lie directly over and abutting with the second plurality of fibers of the at least one second flexible fiber layer. The at least one first and at least one second flexible fiber layers may overlie to provide for about a 100% fill capacity for the flexible non-woven core. In additional embodiments, the first and second flexible fiber layers overlie to provide for less than a 100% fill capacity for the flexible non-woven core to provide spaces between fibers in the first plurality of fibers and fibers in the second plurality of fibers. Furthermore, in various embodiments, the at least one first flexible fiber layer and the at least one second flexible fiber layer are arranged in the plurality of the flexible fiber layers of the flexible fiber core in an alternating manner.

An embodiment includes a fiber core grip in combination with a handle comprising: a grip member comprising an elastomeric material; a flexible core comprising: a first end cap having an aperture extending therethrough, a second end cap, and a plurality of fibers extending between the first end cap and the second end cap, wherein the grip member is coupled to the flexible core; and a handle, wherein the flexible core contacts the handle when the fiber core grip is coupled to the handle.

The flexible core may be a flexible woven core. The plurality of fibers may be woven and/or braided together in a helix shape to provide spaces between the plurality of fibers. The spaces between the plurality of fibers may have a fill capacity of less than about 100%. The over molded grip member may penetrate through the spaces between the plurality of fibers. The handle may be a handlebar.

An embodiment includes a fiber core grip comprising: a grip member; a first end cap having an aperture extending therethrough; a second end cap; and a flexible core comprising a plurality of fibers extending between the first end cap and the second end cap, wherein: the grip member is placed onto the flexible core; the flexible core is configured to compress radially; and the flexible core is configured to resist torsion.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
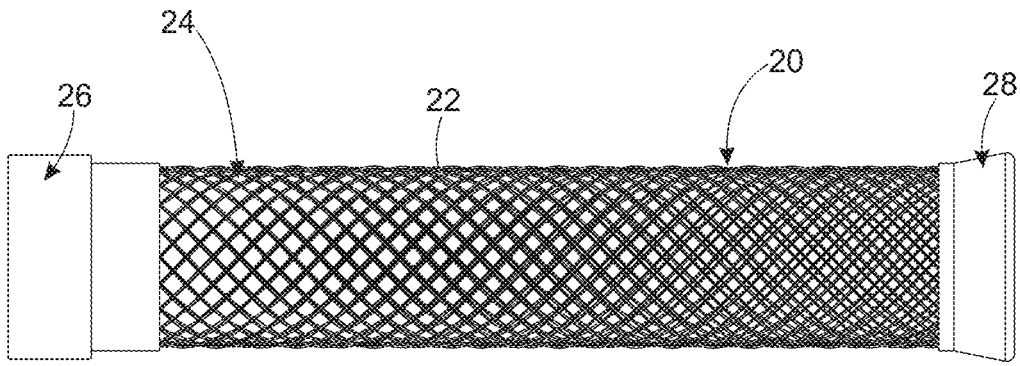
FIG. 1 is a side view of a flexible woven core of a fiber core grip according to an embodiment.
Figure 2:
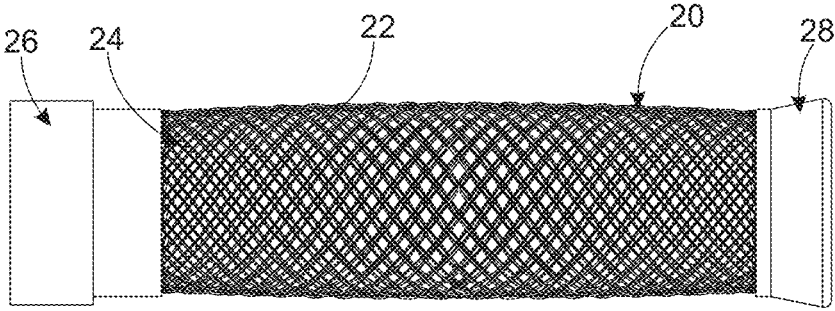
FIG. 2 is a side view of a flexible woven core of a fiber core grip in a compressed position according to an embodiment.
Figure 3:
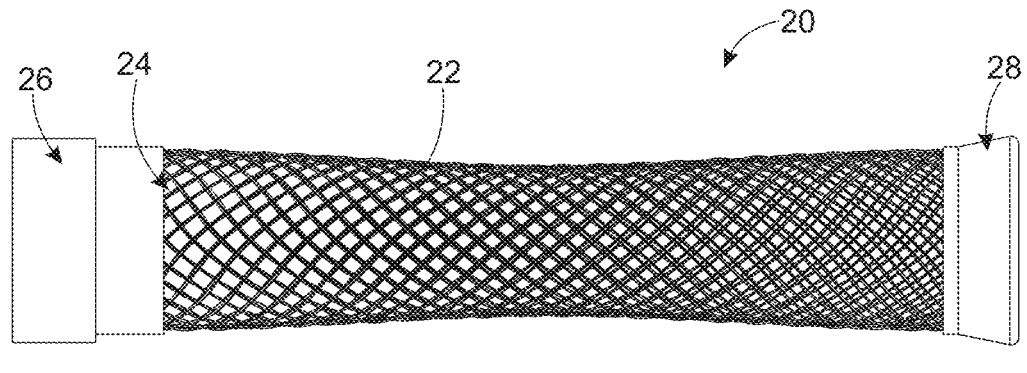
FIG. 3 is a side view of a flexible woven core of a fiber core grip in an expanded position according to an embodiment.
Figure 4:
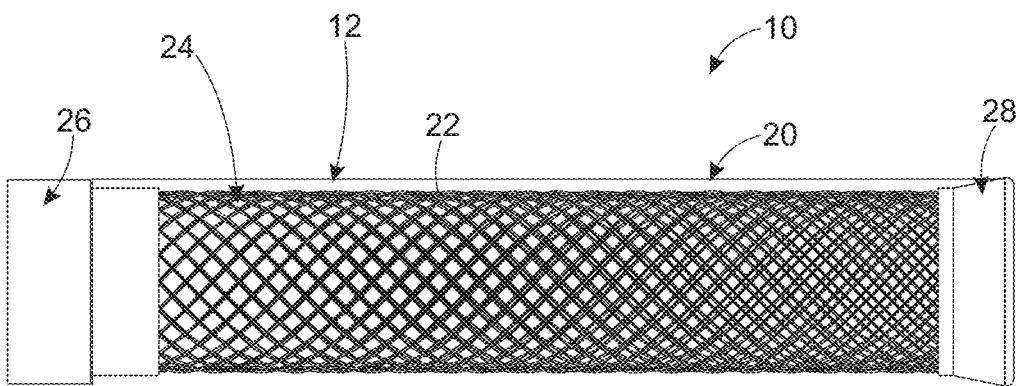
FIG. 4 is a side view of a fiber core grip with a flexible woven core according to an embodiment.
Figure 5:
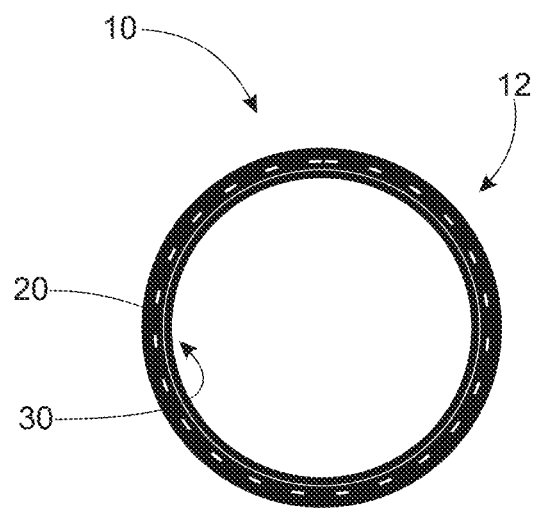
FIG. 5 is a cross-sectional end view of a fiber core grip with a flexible woven core coupled to a handlebar according to an embodiment.

As discussed above, embodiments of the present invention relate to a fiber core grip having a flexible core, such as a flexible woven core, within a grip member comprising an elastomeric material. The fiber core grip may be used on any handle gripped by a user. The fiber core grip may be used with any handlebar, such as a handlebar for bicycles and/or motorized vehicles. In particular, the fiber core grip may be used as a drop handlebar grip, such as on a gravel bike drop section that requires extra comfort during gravel riding. The fiber core grip may slide on and lock near the gravel bike brake hoods. The flexible woven core can easily compress radially when not installed on the handlebar. The flexible woven core can bend and twist when not around the handlebar (cylinder). When the flexible woven core is around the handlebar (cylinder), the angle of the fibers of the flexible woven core prevents torsion from happening.

The fiber core grip may also be used on handles of sports equipment, such as grips for hockey sticks, baseball bats, golf clubs, pickleball paddles, tennis rackets and the like. The flexible nature of the fiber core grip conforms to curved or irregular shapes and enables better grips for children and/or adults with smaller hands.

Referring to FIGS. 1-7, embodiments include a fiber core grip 10 is provided with a grip member 12 comprising an elastomeric material, and a flexible woven core 20 having a plurality of fibers 22 coupled between a first end cap 26 and a second end cap 28, wherein the plurality of fibers 22 are woven and create spaces 24. The first end cap 26 includes an aperture extending therethrough. The second end cap 28 may be a closed end cap. The first and second end caps 26 and 28 may be formed of thermoplastic material. The plurality of fibers 22 may be woven (or braided) fibers that may be orientated in a helix, and when placed around a handlebar 30 or other handle, allows the flexible woven core 20 to transmit torque or axial loads to the end caps 26 and 28, which are locked onto the handlebar 30.

The flexible woven core 20 of the present invention may have a thickness in the range of from about 0.15 to about 1.5 mm, for example, about 0.5 mm thick which allows for thicker elastomeric material on the grip member 12. The plurality of fibers 22 are arranged in a woven configuration of less than about 100% fill capacity, allowing for the elastomeric material to penetrate between the plurality of fibers 22 engaging the handlebar 30 through spaces 24, thereby providing more elastomeric material to enhance comfort. The fiber core grip 10 of the present invention provides comfort and elastomeric material thickness along with ease of installation and long term security. In embodiments, the spaces between the plurality of fibers have a fill capacity of about 100%.

The flexible woven core 20 is positioned across the center of the fiber core grip 10. First and second end caps 26 and 28 may be formed of a solid thermoplastic and are coupled at each end of the flexible woven core 20 to secure the plurality of fibers 22 of the flexible woven core 20 together and provide an area to lock the fiber core grip 10 onto the handlebar 30. The grip member 12 formed of an elastomeric material, such as TPR, may be coupled to the flexible woven core 20 to provide outer grip texture to the fiber core grip 10. The grip member 12 may penetrate through the plurality of fibers 22 through spaces 24 of the flexible woven core 20 and engage the handlebar 30. In embodiments, the grip member 12 may be coupled to the flexible woven core 20 in various ways, such as, but not limited to, over molding, glued, bonded, welded (ultrasonic or heat), and the like. In embodiments, the flexible woven core 20 may comprise a plurality of flexible fiber layers.

Each of the plurality of fibers 22 may have a diameter in the range of from about 0.001 to about 1.0 mm, such as about 0.25 mm in diameter. The weave/braid of the flexible woven core 20 may be oriented at about 20 to about 80 degrees to a longitudinal axis of the handlebar 30 to provide a torque reaction. Suitable materials for the flexible woven core 20 include, but are not limited to, any fiber that can be woven and molded with an elastomeric material, such as carbon fibers, polypropylene (PP) fibers, polyethylene terephthalate (PET) fibers, Kevlar™ fibers, aramid fibers, cotton fibers, nylon fibers, metal fibers, steel fibers, hemp fibers, flax fibers, and/or Dyneema™ fibers.

The first and second end caps 26 and 28 may be formed from any thermoplastic or thermoset material that is semi rigid including, but not limited to nylon, polypropylene, and/or epoxy. Suitable elastomeric materials for the grip member 12 include, but are not limited to any soft durometer material, typically in the range of from about 10 to about 50 Shore A, such as: TPR, silicone, silicone foam, rubber, and/or urethane.

The weave of the flexible woven core 20 works in a similar manner to a finger trap coupled to the handlebar 30, wherein the flexible woven core 20 may be axially compressed from opposing ends into a compressed position (see FIG. 2) that increases the diameter of the flexible woven core 20 to slide onto the handlebar 30. The opposed ends of the flexible woven core 20 may be allowed to outwardly axially shift into an expanded position (see FIG. 3) to act as a locking mechanism by shrinking the diameter to tighten about the handlebar 30. In the compressed position, an inner diameter of the flexible woven core 20 is greater than an outer diameter of the handlebar 30 and in the expanded position, the inner diameter of the flexible woven core 20 is about equal to the outer diameter of the handlebar 30. As the fiber core grip 10 is installed and the first end cap 26 is shifted axially, the inner diameter of flexible woven core 20 shrinks and tightens about the handlebar 30. The opposite is true for removal, which aids in the easy removal of the fiber core grip 10. The fiber core grip 10 having the flexible woven core 20 can accommodate a range of outer diameters of respective handlebars.

Figure 6:
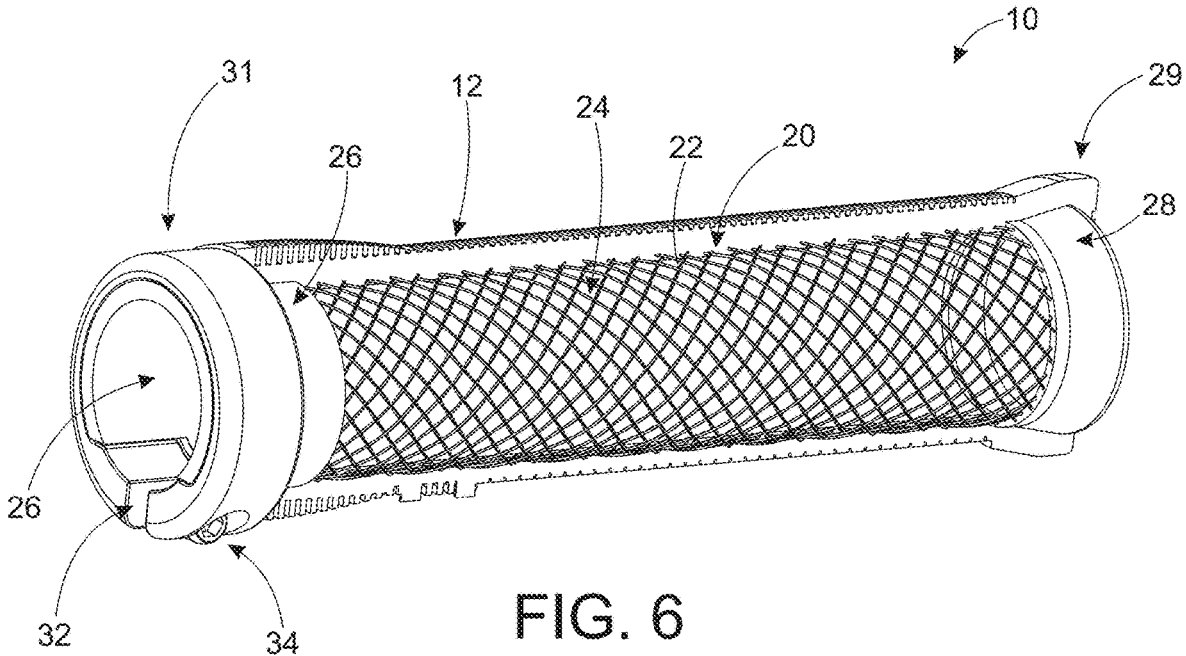
FIG. 6 is a partial cross-sectional perspective view of a fiber core grip according to an embodiment.
Figure 7:
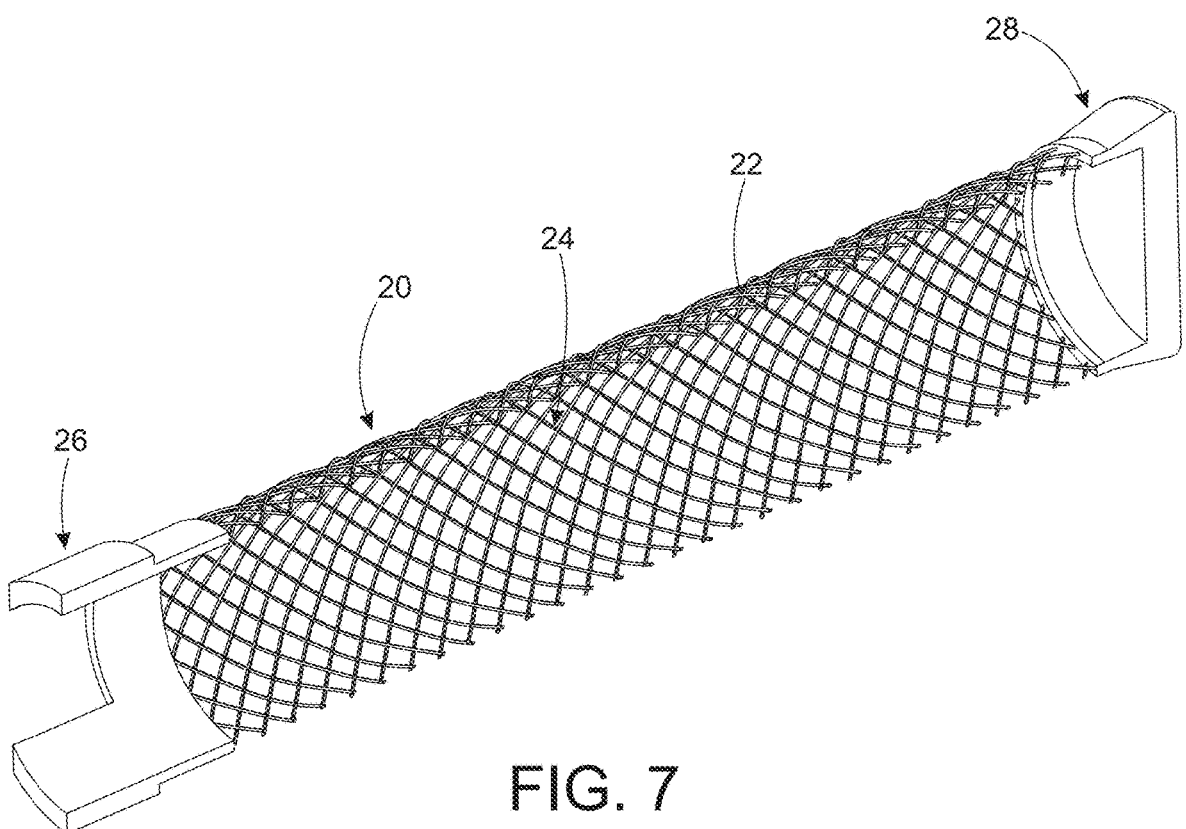
FIG. 7 is a cross-sectional perspective view of a flexible woven core according to an embodiment.

Referring to FIGS. 6, an axially split lock-on collar 31 is provided on one end portion of the grip member 12 to secure the first end cap 26 to the handlebar 30. The opposite end portion of the grip member 12 is provided with an annular frustoconical member 29 which seats on the second end cap 28. The axially split lock-on collar 31 is provided with an axially extending slotted portion 32 that is selectively opened and closed by a fastener 34. The fastener 34 closes the axially extending slotted portion 32 so that the axially split lock-on collar 31 compresses about the first end cap 26 positioned about the handlebar 30. The fiber core grip 10 is locked onto the handlebar 30 via compression of the axially split lock-on collar 31 acting circumferentially about the first end cap 26. The forces applied to the fiber core grip 10 are primarily taken up by the axially split lock-on collar 31 and by the plurality of fibers 22 of the flexible woven core 20. The axially split lock-on collar 31 may be formed of metal and/or plastic and may be separately removable, integral and/or co-molded with the grip member 12.

Figure 8:
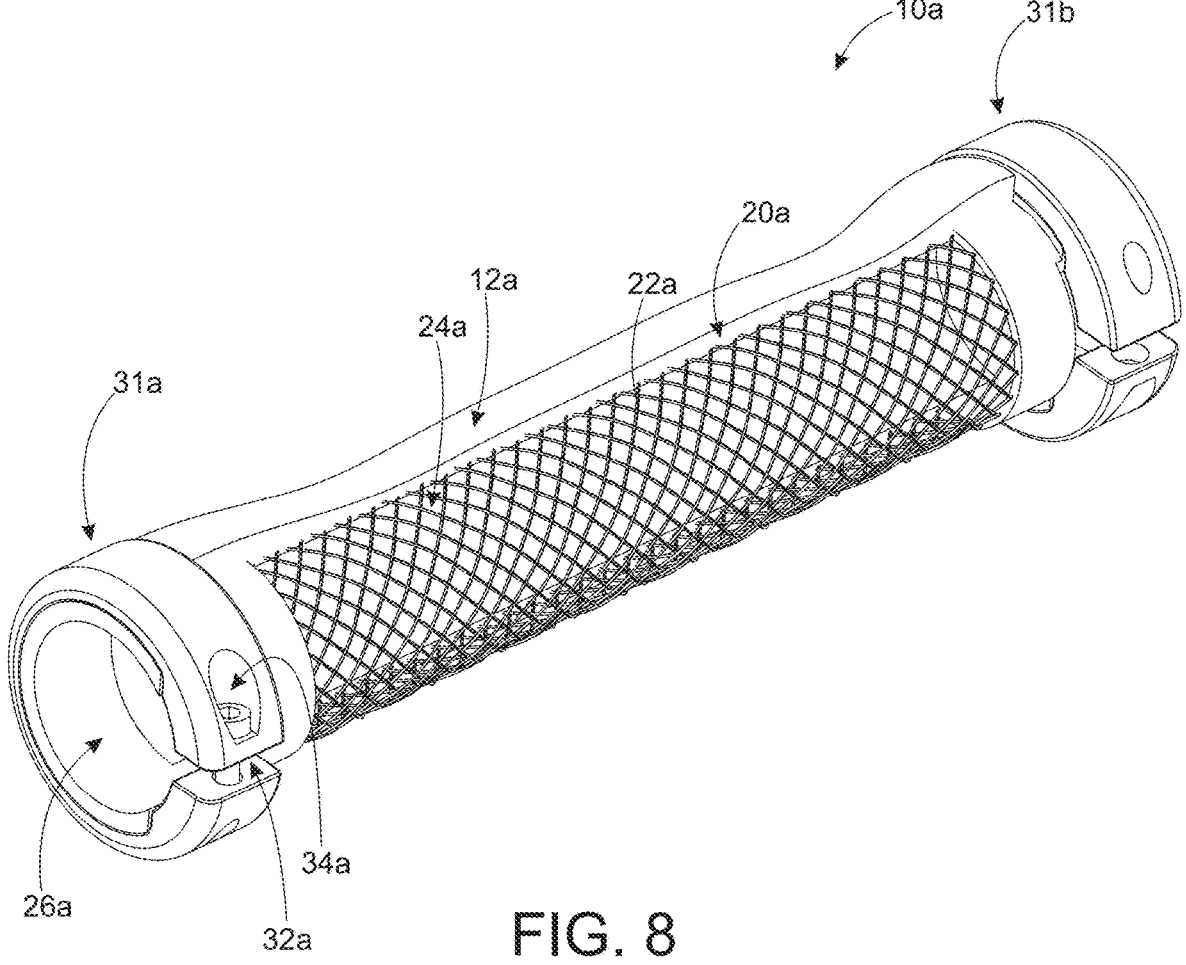
FIG. 8 is a partial cross-sectional perspective view of a fiber core grip according to an embodiment.
Figure 9:
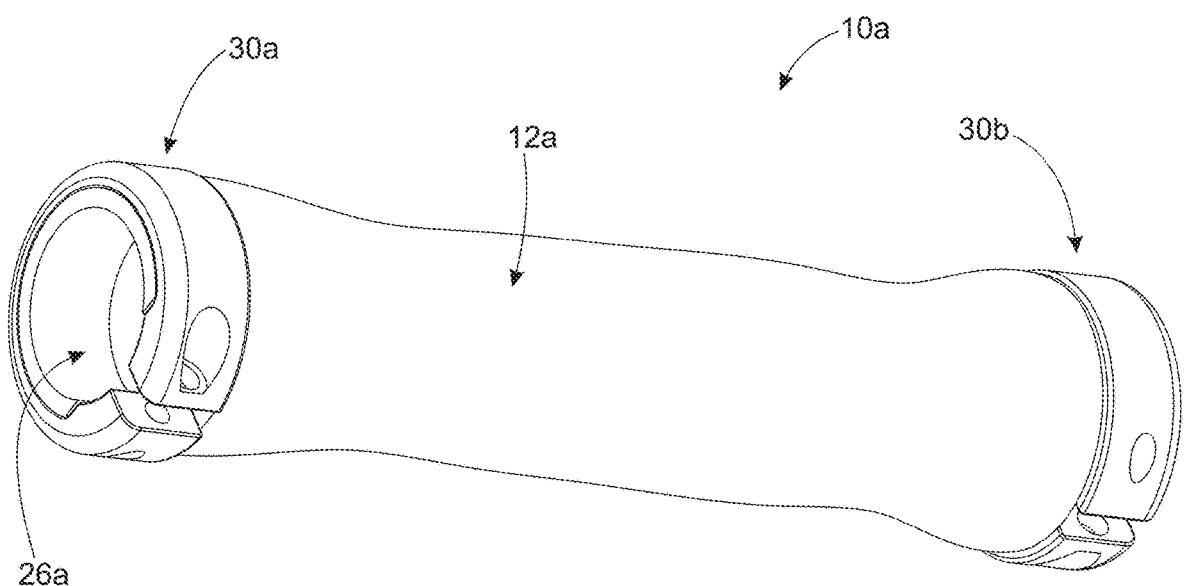
FIG. 9 is a perspective view of a fiber core grip according to an embodiment.
Figure 10:
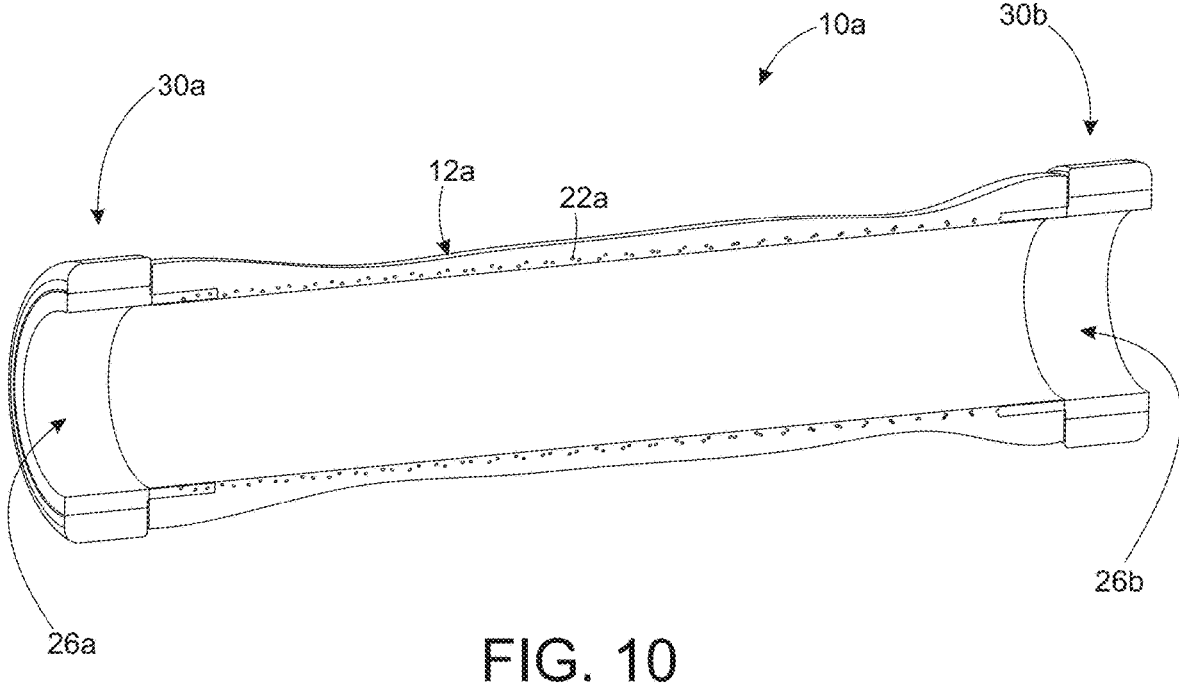
FIG. 10 is a cross-sectional perspective view of a fiber core grip according to an embodiment.

Referring to FIGS. 8-10, in another embodiment, a fiber core grip 10a is provided with a grip member 12a and a flexible woven core 20a having a plurality of fibers 22a which are woven to create spaces 24a therein. The fiber core grip 10a is provided with a pair of opposite end caps 26a, 26b having respective apertures therethrough (See FIG. 10). Each of the opposite end caps 26a, 26b is respectively provided with an axially split lock-on collar 31a, 31b to secure each end cap 26a, 26b of the fiber core grip 10a to the handlebar 30.

Figure 11A:
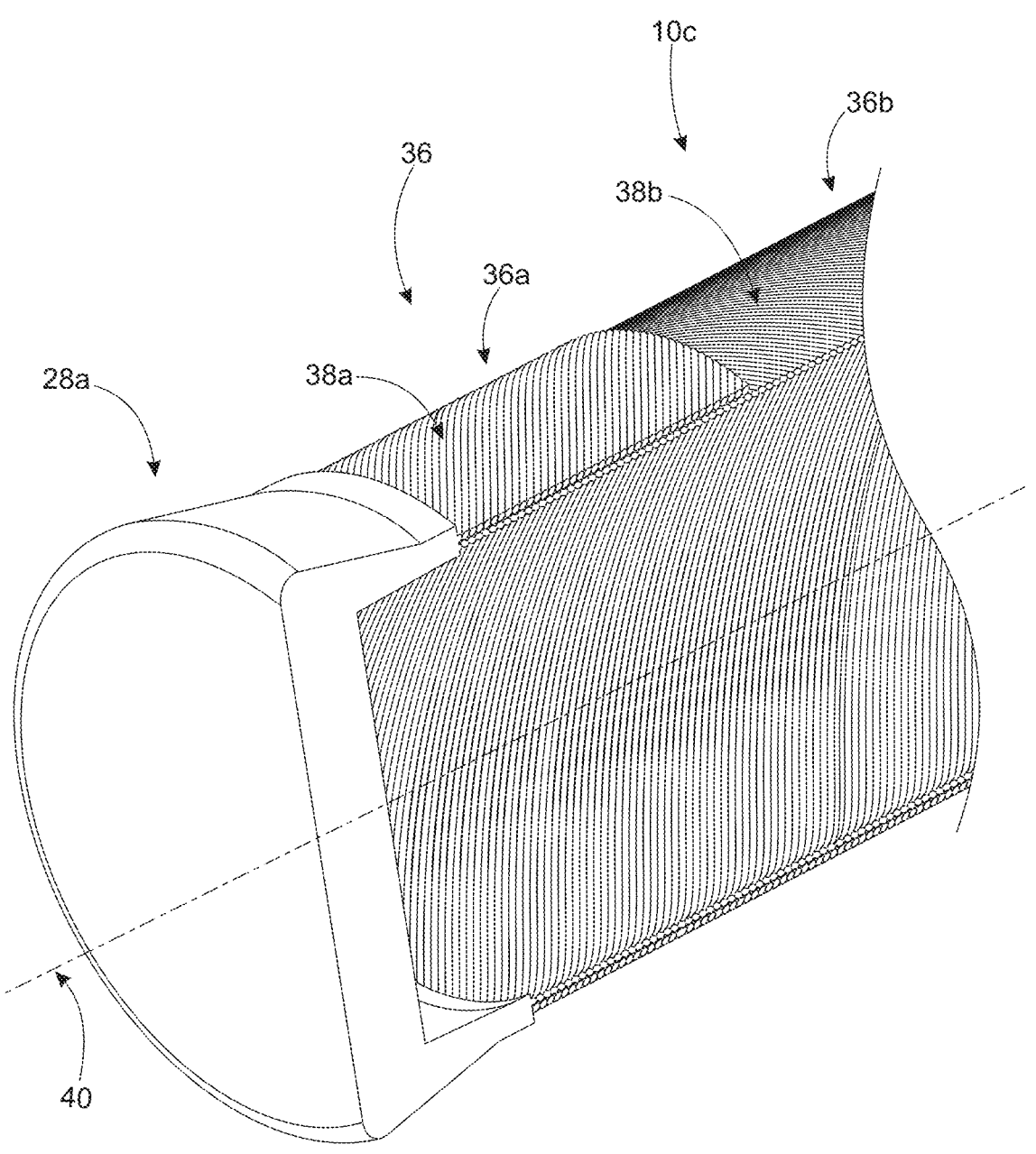
FIG. 11A is a partial cross-sectional perspective view of a flexible non-woven core of a fiber core grip according to an embodiment.
Figure 11B:
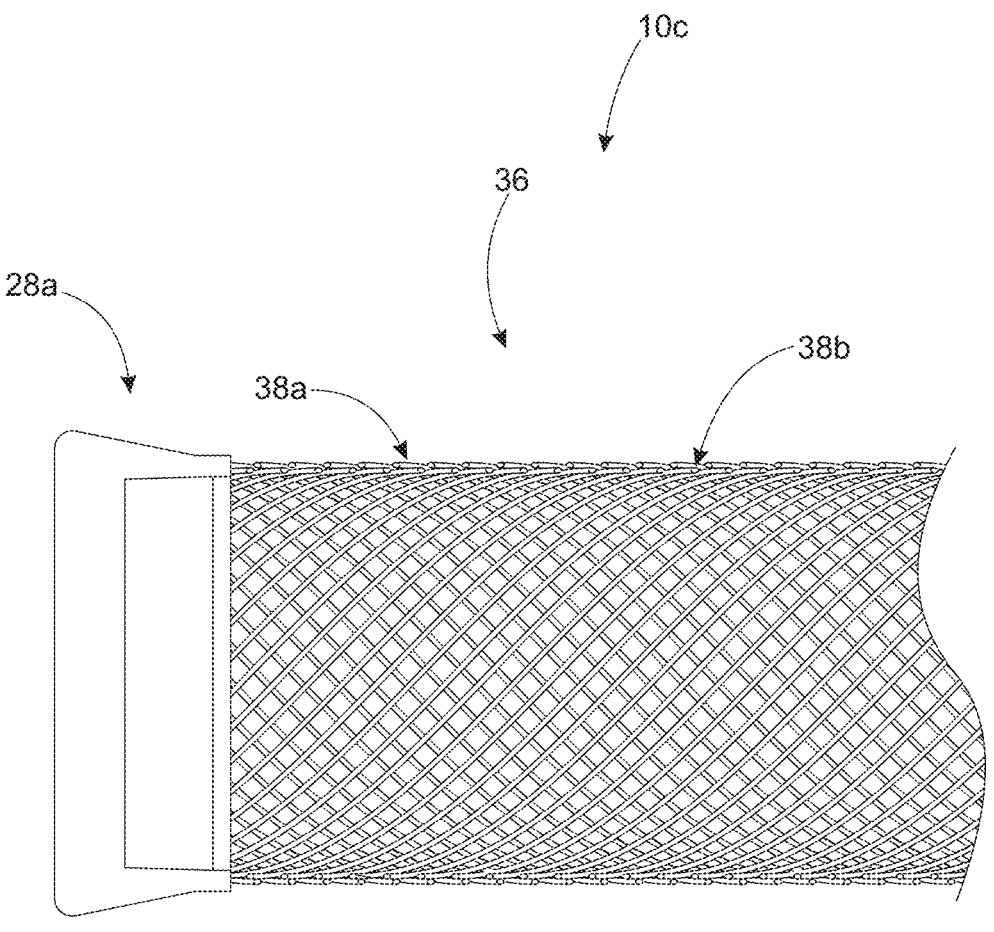
FIG. 11B is a partial cross-sectional side view of a flexible non-woven core of a fiber core grip according to an embodiment.

Referring to FIG. 11A, in another embodiment, fiber core grip 10c may be provided with a flexible non-woven core 36 having a plurality of flexible fiber layers comprising at least one first flexible fiber layer 36a and at least one second flexible fiber layer 36b, first end cap (not shown) and second end cap 28a. A first plurality of fibers 38a is arranged to form the at least one first flexible fiber layer 36a by securing the first plurality of fibers 38a contiguously together in a parallel relationship and extending at a first angle with respect to a longitudinal axis 40 of the fiber core grip 10c. A second plurality of fibers 38b is arranged to form the at least one second flexible fiber layer 36b by securing the second plurality of fibers 38b contiguously together in a parallel relationship and extending at a second angle in an opposite direction to the first angle with respect to the longitudinal axis 40 of the fiber core grip 10c. The first plurality of fibers 38a of the first flexible fiber layer 36a is arranged to lie directly over and abutting with the second plurality of fibers 38b of the second flexible fiber layer 36b. The overlying of the first and second fiber layers 36a, 36b provides for about a 100% fill capacity for the flexible non-woven core 36. In some embodiments of the fiber core 36, as depicted in FIG. 11B, the first and second flexible fiber layers 36a, 36b overlie to provide for less than a 100% fill capacity for the flexible non-woven core 36 to provide spaces between fibers in the first plurality of fibers 38a of the first flexible fiber layer 36a and fibers in the second plurality of fibers 38b of the second flexible fiber layer 36b. In this embodiment, the grip member 12 penetrates through the spaces.

It will be understood that while FIGS. 11A and 11B depict at least one first and at least one second flexible fiber layers 36a, 36b, embodiments may include the at least one first and at least one second flexible fiber layers 36a, 36b arranged in the plurality of the flexible fiber layers of the flexible fiber core in an alternating manner. For example, and without limitation, an embodiment wherein the plurality of flexible fiber layers includes three layers, it may include a first flexible fiber layer with fibers extending in a first angle, a second flexible fiber layer with fibers extending in a second angle, and then another first flexible fiber layer with fibers extending in the first angle. The pattern of first flexible fiber layer, second flexible fiber layer, first flexible fiber layer, second flexible fiber layer, and so forth may be repeated for a desired number of the plurality of flexible fiber layers to form the fiber core 10c.

Figure 12:
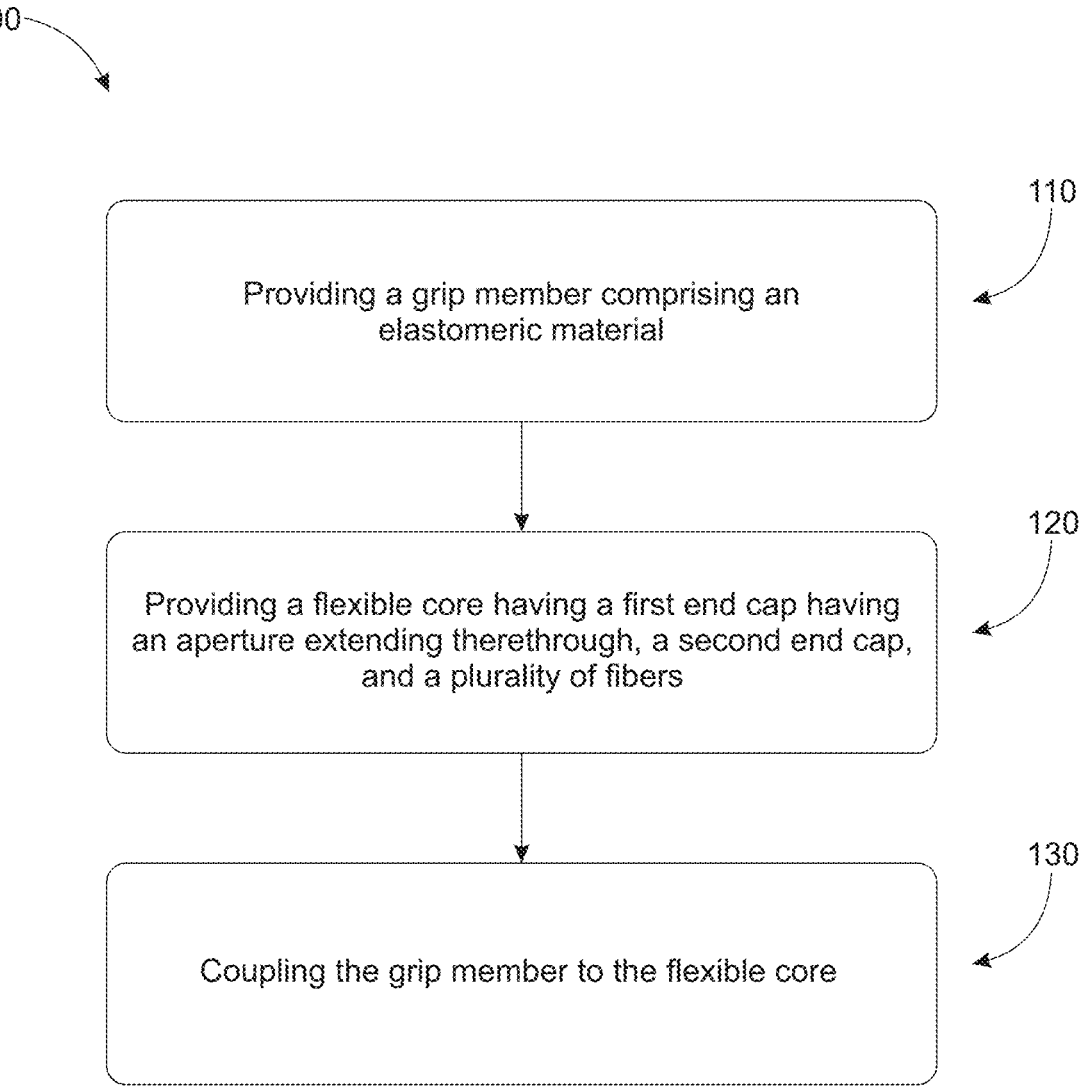
FIG. 12 is a block diagram of steps of a method of manufacturing a fiber core grip on a handle according to an embodiment.

FIG. 12 is a block diagram of steps of a method 100 of manufacturing of a fiber core grip on a handle. Method 100 comprises providing a grip member comprising an elastomeric material (Step 110); providing a flexible core having a first end cap having an aperture extending therethrough, a second end cap, and a plurality of fibers (Step 120); and coupling the grip member to the flexible core (Step 130).

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A fiber core grip comprising:
   a grip member;
   a first end cap having an aperture extending therethrough;
   a second end cap; and
   a flexible core comprising a plurality of fibers extending between and directly coupled to the first end cap and the second end cap, wherein the grip member is coupled to the flexible core, and wherein the fiber core grip is configured to couple to a handle.

2. The fiber core grip of claim 1, wherein the grip member comprises an elastomeric material.

3. The fiber core grip of claim 1, wherein the flexible core is a flexible woven core.

4. The fiber core grip of claim 3, wherein the plurality of fibers is woven and/or braided together in a helix shape to provide spaces between the plurality of fibers.

5. The fiber core grip of claim 4, wherein the spaces between the plurality of fibers have a fill capacity of less than about 100%.

6. The fiber core grip of claim 4, wherein the spaces between the plurality of fibers have a fill capacity of about 100%.

7. The fiber core grip of claim 5, wherein the grip member penetrates through the spaces between the plurality of fibers.

8. The fiber core grip of claim 1, wherein the handle is a handlebar.

9. The fiber core grip of claim 1, wherein the second end cap is provided with a closed end.

10. The fiber core grip of claim 1, wherein the flexible core is a flexible non-woven core.

11. The fiber core grip of claim 10, wherein the flexible core further comprises a plurality of flexible fiber layers.

12. The fiber core grip of claim 11, wherein the flexible non-woven core comprises at least one first flexible fiber layer and at least one second flexible fiber layer.

13. The fiber core grip of claim 12, wherein the plurality of fibers comprises a first plurality of fibers arranged to form the at least one first flexible fiber layer by securing the first plurality of fibers contiguously together in a parallel relationship and extending at a first angle with respect to a longitudinal axis of the fiber core grip.

14. The fiber core grip of claim 13, wherein the plurality of fibers comprises a second plurality of fibers arranged to form the second flexible fiber layer by securing the second plurality of fibers contiguously together in a parallel relationship and extending at a second angle in an opposite direction to the first angle with respect to the longitudinal axis of the fiber core grip.

15. The fiber core grip of claim 14, wherein the first plurality of fibers of the at least one first flexible fiber layer is arranged to lie directly over and abutting with the second plurality of fibers of the at least one second flexible fiber layer.

16. The fiber core grip of claim 15, wherein the at least one first and at least one second flexible fiber layers overlie to provide for about a 100% fill capacity for the flexible non-woven core.

17. The fiber core grip of claim 15, wherein the at least one first and at least one second flexible fiber layers overlie to provide for less than a 100% fill capacity for the flexible non-woven core to provide spaces between fibers in the first plurality of fibers and fibers in the second plurality of fibers.

18. The fiber core grip of claim 15, wherein the at least one first flexible fiber layer and the at least one second flexible fiber layer are arranged in the plurality of the flexible fiber layers of the flexible fiber core in an alternating manner.

19. The fiber core grip of claim 3, wherein the flexible woven core further comprises a plurality of flexible fiber layers.

20. A fiber core grip in combination with a handle comprising:
   a grip member comprising an elastomeric material;
   a flexible core comprising:
      a first end cap having an aperture extending therethrough;
      a second end cap; and
      a plurality of fibers extending between and directly coupled to the first end cap and the second end cap, wherein the grip member is coupled to the flexible core; and
   a handle, wherein the flexible core contacts the handle when the fiber core grip is coupled to the handle.

21. The fiber core grip in combination with the handle of claim 20, wherein the flexible core is a flexible woven core.

22. The fiber core grip in combination with the handle of claim 21, wherein the plurality of fibers is woven and/or braided together in a helix shape to provide spaces between the plurality of fibers.

23. The fiber core grip in combination with the handle of claim 22, wherein the spaces between the plurality of fibers have a fill capacity of less than about 100%.

24. A fiber core grip comprising:
   a grip member;
   a first end cap having an aperture extending therethrough;
   a second end cap; and
   a flexible core comprising a plurality of fibers extending between and directly coupled to the first end cap and the second end cap, wherein:
      the grip member is coupled to the flexible core;
      the flexible core is configured to compress radially; and
      the flexible core is configured to resist torsion.

* * * * *